United States Patent [19]

Grassmuck et al.

[11] Patent Number: 4,852,424
[45] Date of Patent: * Aug. 1, 1989

[54] FLYWHEEL ASSEMBLY

[75] Inventors: Volker Grassmuck; Benno Jörg, both of Weinheim; Eberhard Sommer, Laudenbach, all of Fed. Rep. of Germany

[73] Assignee: Firma Carl Freudenberg, Weinheim/Bergstr., Fed. Rep. of Germany

[*] Notice: The portion of the term of this patent subsequent to Jul. 25, 2006 has been disclaimed.

[21] Appl. No.: 68,180

[22] Filed: Jun. 29, 1987

[30] Foreign Application Priority Data

Jul. 1, 1986 [DE] Fed. Rep. of Germany ....... 3621997

[51] Int. Cl.$^4$ .............................................. F16F 15/10
[52] U.S. Cl. ........................................ 74/574; 74/572; 192/106.1; 464/66
[58] Field of Search ............... 74/574, 573 F, 572, 74/7 C, 7 R; 192/48.5, 70.17, 104 C, 106.1; 415/119; 464/24, 27, 66–68

[56] References Cited

U.S. PATENT DOCUMENTS

| 3,301,009 | 1/1967 | Coulter | 74/574 |
|---|---|---|---|
| 3,990,324 | 11/1976 | Fishbaugh et al. | 74/574 |
| 4,370,900 | 2/1983 | Hartz | 74/574 |
| 4,474,276 | 10/1984 | Loizeau | 192/106.1 |
| 4,558,773 | 12/1985 | Schafer | 192/106.1 |
| 4,560,367 | 12/1985 | Wolf et al. | 464/83 |
| 4,583,912 | 4/1986 | Ball et al. | 74/574 |
| 4,601,678 | 7/1986 | Wolf et al. | 464/83 |

FOREIGN PATENT DOCUMENTS

| 1112911 | 11/1984 | Canada | 74/573 F |
|---|---|---|---|
| 2733880 | 2/1978 | Fed. Rep. of Germany | 74/573 |
| 2746127 | 4/1979 | Fed. Rep. of Germany | 74/574 |
| 3440927 | 6/1985 | Fed. Rep. of Germany . | |
| 2362311 | 3/1978 | France | 74/573 F |
| 1504998 | 3/1978 | United Kingdom | 74/573 F |
| 2121914 | 1/1984 | United Kingdom | 74/573 F |

OTHER PUBLICATIONS

IBM Technical Disclosure Bulletin, vol. 24, No. 6, Nov. 1981, p. 3088, Torsional Vibration Damper, Zimmerman.

Handbook of Tables for Applied Engineering Science, 2nd Ed., CRC Press, p. 625, Properties of Representative Synthetic Oil.

*Primary Examiner*—Vinh Luong
*Attorney, Agent, or Firm*—Felfe & Lynch

[57] ABSTRACT

A flywheel assembly having a first flywheel ring joined to the drive shaft and a second flywheel ring joined to the driven shaft, the two rings being mounted concentrically one inside the other for relative rotation. A spring and a damping system are provided parallel to one another between the first and second flywheel ring to inhibit relative rotation. The damping system is provided with a disengaging device by which its damping action is disabled, such that the spring alone is active, in the event of a relative rotation of more than 30°.

26 Claims, 6 Drawing Sheets

FLYWHEEL ASSEMBLY

BACKGROUND OF THE INVENTION

The invention relates to a flywheel assembly having a first flywheel ring joined to the drive shaft and a second flywheel ring joined to the driven shaft, the two rings being mounted concentrically one inside the other in a relatively rotatable manner. A spring and a damping system for the suppression of rotary vibrations are provided parallel to one another between the first and the second flywheel ring.

A flywheel assembly of this type is disclosed in the German published patent application No. 34 40 927 issued on June 13, 1985. The damping system in this case includes two separate functional units which act independently of one another, and one directly after the other, according to the magnitude of the relative rotation of the two rings. However, the operating characteristics of this flywheel assembly are not very satisfactory.

It is the object of the invention to devise a flywheel assembly of the kind specified above, in which the transmission of critical vibrations will be largely inhibited under normal conditions of operation.

SUMMARY OF THE INVENTION

This object as well as other objections which will become apparent from the discussion that follows, are achieved, according to the present invention by providing the damping system with a disengaging device by which its damping action is disabled, such that the spring alone is active, in the event of a relative rotation of the two flywheel rings of more than a certain angular distance, such as 30°.

If the flywheel is constructed as proposed according to the invention, vibrations are smaller in range, and the angular rotations about the null point are damped to a high degree by the damping system connected in parallel with the spring. The undesirable transmission of such vibrations is thereby reliably prevented, as is the danger of the occurrence of resonant vibrations of increased amplitude.

When vibrations of relatively great amplitude are introduced, if the first angular dimension is exceeded, the damping system is put out of operation. Then the spring alone is active, which results in an excellent isolation of corresponding vibrations by the flexibility of the spring. The vibrations therefore can no longer be transmitted undesirably via the flywheel.

In one preferred embodiment of the invention, the springs and the damping systems are of an annular configuration and associated concentrically with the first and second flywheel ring. Any imbalance is thus avoided and permits a problem-free use of the proposed flywheel in drive trains in which very high rotational speeds occur.

In another preferred embodiment, provision is made for the spring to be made of rubber-elastic material. This material has, in contrast to metallic materials, an inherent damping property resulting in a more rapid decay of vibrations as well as a certain relief of the burden on the actual damping system. It is obvious that, on account of the considerable gradual difference in effectiveness, the inherent damping property of rubber-elastic materials cannot replace the use of the additional damping system that is provided.

In still another embodiment, the spring connects together bonding surfaces which are provided the first and second flywheel ring and which encircle one another radially. In this manner an especially short axial length of the flywheel is achieved, which facilitates its installation. A reduction of the diameter, on the other hand, can be achieved by a further embodiment in which the spring joins together axially opposite bonding surfaces of the first and second flywheel ring.

The practical application of structures combining features of both embodiments can be considered, such as embodiments in which at least one spring is affixed to axially confronting bonding surfaces of the first and second flywheel ring, and at least one additional spring is affixed to radially encircling bonding surfaces of the first and second flywheel ring. The coaxial carrying of the two flywheel rings inside one another is thus improved.

In another embodiment, the flywheel rings outside of the bonding surfaces are at a distance from the spring. Any heat that might be introduced is thereby kept away from the spring, which is very important as regards the useful life of the spring when polymeric materials are used in making it.

This embodiment may be improved by sealing the cavity formed by the space between the spring and the relatively rotatable flywheel ring and filling this cavity with a liquid. Depending upon the input rotational speed, a pressure builds up in this cavity due to centrifugal force, which is capable, if the design is right, of largely or entirely preventing any deformation due to centrifugal force. The use of the flywheel in applications in which high rotational speeds are involved is thereby facilitated.

In this improved embodiment, the damping system can consist of a driving disk mounted on the first or second flywheel ring. In addition to permitting manufacture at especially low cost, this assures particularly good stability.

Provision is made, in accordance with the invention, to effectively damp only vibrations below a certain maximum amplitude within a range around the static null. Still another preferred embodiment of the invention can attain this effect. In this embodiment the damping system consists of a concentric first friction disk of the one flywheel ring and a concentric, second friction disk of the other flywheel ring, which are resiliently compressed together, while the friction facing the first and second friction disk is provided only in the area of sectors corresponding to the first angular amount and is omitted between them. In the event of a rotation of the first and second flywheel ring exceeding this angular amount the friction facings on both sides come out of engagement, so that the two flywheel rings can rotate easily against the force of the spring along without any other friction resistance. The friction disks on both sides can reach around one another radially. For reasons of ease of manufacture, however, preference is given to an embodiment in which the two friction disks are coaxial with one another and accordingly are compressed axially against one another.

The ranges of relative rotatability in which the two flywheel rings are joined together elastically and with damping, or elastically alone, can be defined against one another in any desired manner by the first angular amount. Normally, an angle of ±30° should not be exceeded. In general machine construction an angle of ±10° has proven advantageous, and in automotive engineering an angle of ±5°. Thus, in any kind of application it is possible to achieve an optimum suppression of unwanted vibrations in the entire frequency range.

The damping action can be produced by a viscosity damper, as provided in further embodiments of the present invention. Accordingly, the liquid contained in the cavity has a viscosity of 100 to 2,000,000 cSt, and the damping system is formed by the liquid and the relatively movable surfaces of the spring and of the first and/or second flywheel ring which are wetted by the liquid. In addition, the liquid prevents centrifugally caused deformations of the spring. The liquid may have the viscosity of a paste; it may, for example, be a grease.

The viscosity dampers according to certain, particular embodiments of the invention are characterized chiefly by the fact that the relatively rotatable surfaces are provided with damping zones which can be carried past one another to form the disengaging means, the damping zones in the nonrotated state having a shorter distance apart from the rotated state, and the damping zones being uniformly distributed around the circumference. It is desirable to provide a considerable difference in spacing between the confronting damping zones of the two flywheel rings in the nonrotated state and in the rotated state, this difference amounting to a factor of at least 0.5. The confronting damping zones thus have, in the nonrotated state of the two flywheel rings, a smaller distance apart than in the rotated state, so that the resulting damping forces in the first case are substantially greater.

Rotary vibrations of low amplitude in a range around the static null are therefore damped to a high degree, while the damping action upon the introduction of rotary vibrations is negligibly low if the first angular amount is exceeded, depending upon the dimensional tuning. In this construction of the damping system, therefore, a differentiated effectiveness thus results with regard to the introduction of vibrations of different amplitudes. In this case, however, it is achieved without the use of precision parts that are liable to wear, which is of great advantage from the standpoint of easy manufacture as well as the achievement of an especially long useful life.

In a number of applications it has been found desirable for the different spacings between the confronting damping zones to merge with one another in one or more steps. The degree of damping action achieved diminishes in this case according to the degree of the relative rotation of the two flywheel rings, which is the case, for example, in an abrupt change in the load on an engine.

According to a particular, preferred embodiment, the greater spacing of the damping zones merges uniformly with the other areas. Abrupt changes in damping force, which under certain circumstances can cause a pulse-like excitation of the entire drive train of a motor vehicle, can thereby be prevented.

The total damping action achieved depends basically on the magnitude of the areas wetted on both sides by the damping liquid. They can be increased, if necessary, by placing at least one annularly extending projection on the spring and/or on the first or second flywheel ring.

For a full understanding of the present invention, reference should now be made to the following detailed description of the preferred embodiments of the invention and to the accompanying drawings.

DESCRIPTION OF THE PREFERRED EMBODIMENTS

Figure 1:
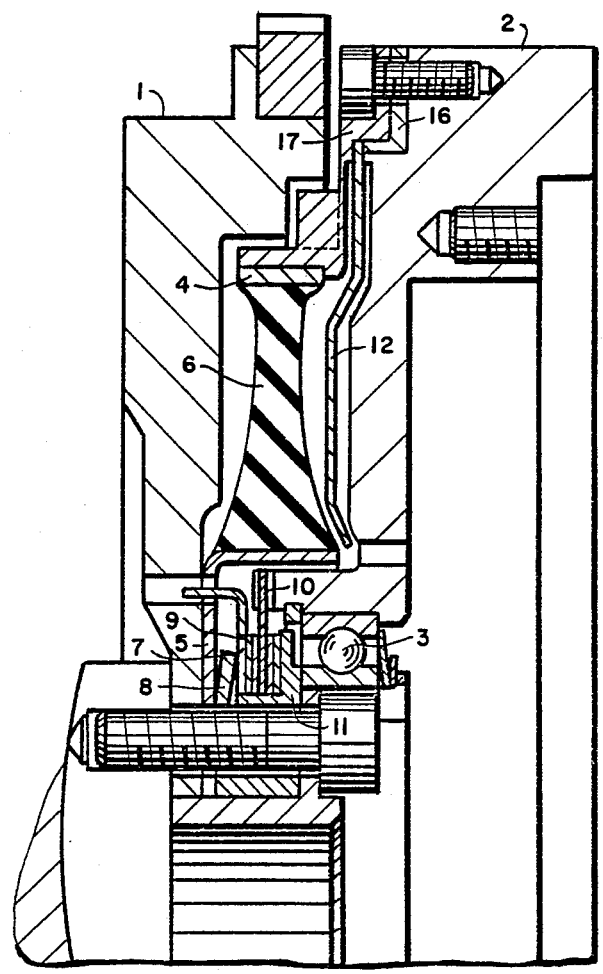
FIG. 1 is a cross-sectional view of one embodiment of a flywheel assembly in which the driving wheel is provided with friction linings and is affixed circumferentially to the drivers of the flywheel ring that holds them.

The flywheel assembly represented in cross section in FIG. 1 is intended for use between a motor and the transmission of a motor vehicle.

It includes the first flywheel ring 1 provided with the starter gear on the drive side and with a second flywheel ring 2 which, after installation, receives the clutch disk, that is not shown. The first flywheel ring 1 and the second flywheel ring 2 are mounted coaxially one inside the other for relative rotation about the bearing 3. They enclose an annular cavity in which the spring 6 is disposed.

The spring 6 is of annular shape and consists of rubber-elastic material. It is vulcanized at its outer circumference to the mounting ring 4 and at its inner circumference to the mounting ring 5. The mounting ring 4 is screwed to the second ring 2 with the interposition of a flange 17 and a thermal insulator 16, whereas the mounting ring 5 is bolted to the first flywheel ring 1. The thermal insulator 16 is prolonged radially inwardly to form the circularly shaped heat shield 12.

The mounting ring 5 is of an angular profile and has in its radially inwardly extending area openings distributed uniformly on its circumference which are engaged by axially projecting fingers 25 of the pressure ring 7. The pressure ring 7 has on the opposite side from the fingers 25 sector-shaped elevations 20 which are uniformly distributed on the circumference. The angle ring 11 is also provided with elevations of identical configuration associated in mirror-image relationship with elevations 20. The transitions to the depressed circumferential portions of the pressure ring 7 and of angle ring 11 are of a rounded configuration. The driving disk 9 is disposed axially between the portions of pressure ring 7 and angle ring 11 bearing the elevations 20. This disk rests together with the pressure ring 7 on a friction bearing of the angle ring 11 and is provided axially on both sides with friction pads 18 and 19 associated with the elevations 20 of the pressure ring 7 and angle ring 11. The cup spring 8 causes an axial pressing together of the pressure ring 7, the driving disk 9 and the angle ring 11. The angle ring 11 and the pressure ring 7 are nonrotatable with respect to one another and with respect to the first flywheel ring 1, and the driving disk 9 is nonrotatable with respect to the second flywheel ring 2. The driving action in each case is brought about by bolting in the one case and, in the other case, the fingers 10 which engage without circumferential free play in correspondingly shaped openings in the first and second flywheel rings 1 and 2.

The friction pads 18 and 19 disposed on the two axial surfaces of the driving disk 9 are sector-shaped and distributed alternately on the circumference of the driving disk 9. In the example illustrated they adjoin one another directly.

The former 18 are formed by brake pads with a high coefficient of friction, the latter 19 of a material having an extremely low friction coefficient. The friction pads of type 18 are in a mirror-image relationship to one another. The same is true of the friction pads of type 19.

The driving disk 9 is associated with the pressure ring 7 and the angle ring 11 such that, when the rotary vibration damper is in the static position of rest, the friction pads 18, on the one hand, and the elevations, on the other, will coincide as closely as possible with one another.

A rotation of the driving disk 9 relative to the pressure ring 7 and the angle ring 11 therefore makes it necessary at the beginning to overcome a considerable friction resistance which, in the scope of the present invention, is utilized for the intensified damping of vibrations of small torque amplitude.

Figure 2:
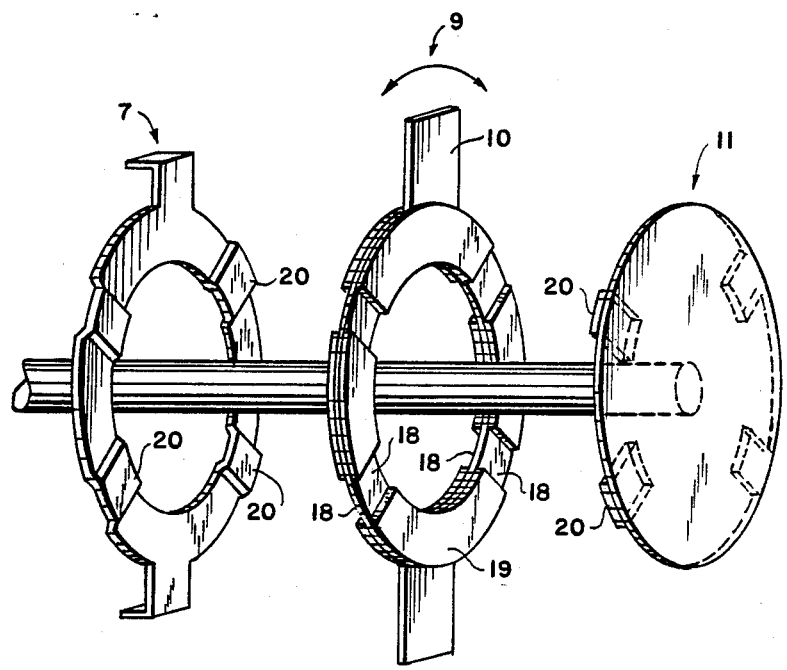
FIG. 2 is a representational, assembly diagram of a driving disk associated with a pressure ring and an angle ring used in the flywheel assembly embodiment of FIG. 1.

In the event of a still greater relative rotation between the driving disk 9, on the one hand, and the pressure ring 7 and angle ring 11, on the other, the elevations 20 and the friction pads 18 of the driving disk 9, formed by the brake pads, come increasingly out of alignment, increasingly reducing the friction resistance. The damping action diminishes in the same degree and prevents the occurrence of reaction forces. The principle of action is shown in FIG. 2.

The second flywheel ring 2 is provided in the area of its inner circumference with axial projections engaging the intervals between the fingers 10. These projections transmit the rotary movement to the fingers 10, whereby the damping system formed by the parts 5, 7, 8, 9 and 11, after exceeding a certain minimum rotation of the first flywheel ring 1 with respect to the second flywheel ring 2, becomes increasingly ineffective, until the elevations 20 of the pressure ring 7 and angle ring 11 finally slide only on the pads 19 of lower coefficient of friction. The heat shield 12 affixed to the second flywheel ring serves for the isolation of the spring 6 consisting of rubber-elastic material against undesired heating.

Figure 3:
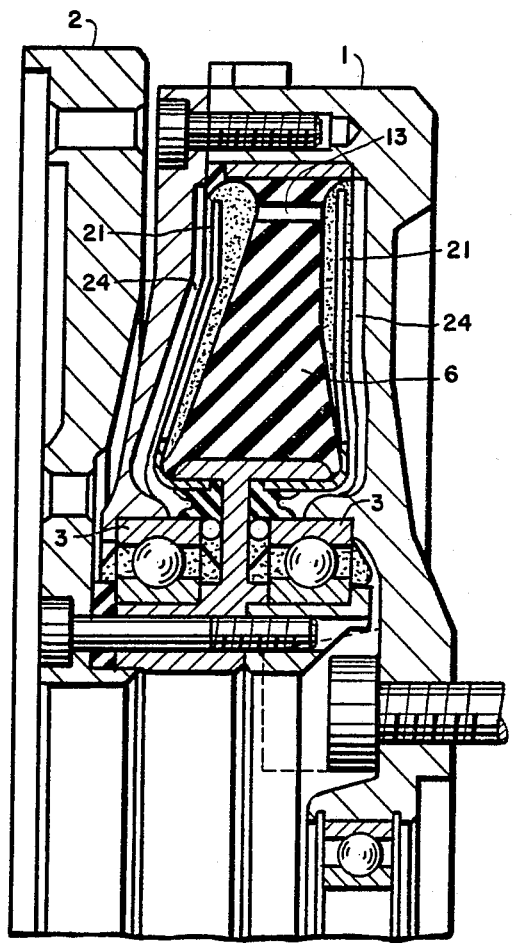
FIG. 3 is a cross-sectional view of another embodiment of a flywheel assembly in which the spring is disposed between bonding surfaces radially surrounding one another and in which the damping system consists of a viscosity damper.

The configuration shown in FIG. 3 is similar to the one described above. In this case too the spring 6 consisting of rubber-elastic material is of annular shape and is affixed to bonding surfaces of the first flywheel ring 1 and second flywheel ring 2 encompassing one another radially.

The spring 6 is at an axial distance on both sides from the confronting walls of the first flywheel ring 1, and the chambers thus formed are sealed dynamically from the second flywheel ring 2 and filled with silicone oil of a viscosity of 100 to 200,000 centistokes. The latter at the same time wets both sides of the toothed disks 27 reaching into the chambers, which are affixed to the second flywheel ring 2 at their inner circumference. The first flywheel ring 1 is provided with pocket-like recesses 24 which are opposite the spaces between the teeth of the toothed disks. A rotation of the first flywheel ring 1 relative to the second flywheel ring 2 will result, therefore, not only in an elastic deformation of the spring 6 but also in a viscosity-damping of the movement. The liquid-filled chambers adjoining the spring 6 axially are connected to one another by the passage 13 disposed adjacent the outer circumference of the spring 6. The pressure rise that results in both chambers from a rotary movement is therefore completely balanced and assures good mechanical supporting of the spring 6 against deformations due to centrifugal force.

Even a unilateral heating will not be able to change the favorable conditions in this regard. This embodiment is therefore suitable for applications in which heavy loads are involved.

Deformations of the spring 6 can be compensated most simply by the use of a liquid which has the same density as the material of the spring. Such liquids are known. Filling up the free space in the revolving shaft coupling all the way to the radially interior boundary surface of the spring leads, in this case, to complete compensation.

In cases in which the spring has a greater density than the liquid, similar results can be achieved by a correspondingly greater overflooding of the radially interior surface of the spring in the rotating shaft coupling. The level of the flooding required in the particular case can either be determined precisely by experiment or it can be calculated. However, there is no need in most cases to make a particular effort to provide precision workmanship in this regard; such effort can be replaced, at least partially, by knowledge gained through experience.

The clear space containing the liquid is closed off in a leak-proof manner both radially outwardly and axially on both sides. Due to the annular distribution of the volume of liquid it contains while the shaft is turning, it needs no secondary sealing in the radially interior area, as long as it is assured that the volume of liquid necessary for operation is unable to escape when the shaft is stopped.

The use of a gasket between the two flanges in the above-mentioned area, however, is possible, and is recommended especially when the satisfaction of the above-stated requirement is not possible or when it is to be feared that foreign matter may lodge in the space during the normal operation of the shaft coupling. Particularly the use of dynamic shaft seals has proven very effective. Their use in other areas of the shaft coupling is also possible, but it calls for special consideration of the pressure increase within the space, resulting from centrifugal force. Association with the inside diameter of the shaft coupling is therefore preferred.

Figure 5:
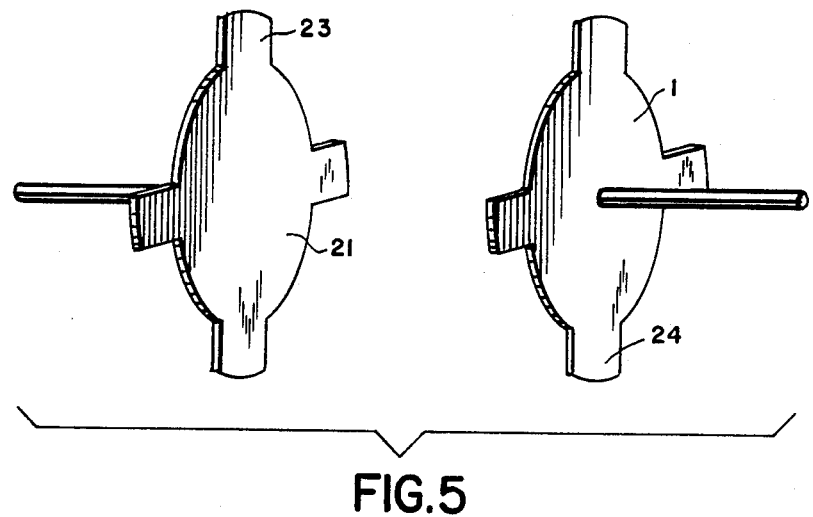
FIGS. 5 and 6 are representational diagrams of viscosity dampers in the disassembled and assembled states, respectively, according to a first preferred embodiment.

Operation will be explained in conjunction with FIGS. 5 and 6.

Figure 4:
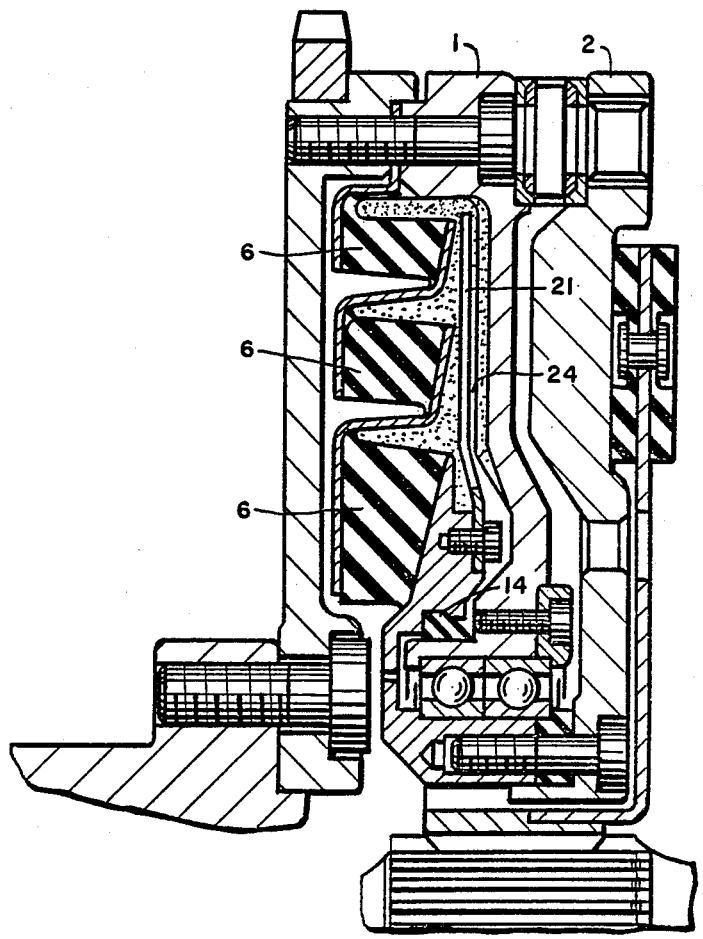
FIG. 4 is a cross-sectional view of an embodiment similar to that of FIG. 3, in which the spring is affixed to axially separated bonding surfaces on the flywheel rings.

The flywheel shown in FIG. 4 is functionally similar to the one described above. In this case too a viscosity damper is used, in which the spring is wetted only externally by viscous fluid since it is affixed to bonding surfaces of the first flywheel ring 1 and second flywheel ring 2 which are offset axially from one another. When the flywheel is rotating, the liquid fills the free space available up to about one-third of the level of the radially interior boundary surface of the spring and thus prevents deformation of the two outer springs due to centrifugal force. The liquid is therefore contained in only a single, closed cavity and, therefore, in contrast to the embodiment described above, only a single gasket 14 suffices for the dynamic sealing of this cavity.

The spring 6, in the embodiment according to FIG. 4, has been divided into three rings surrounding one another radially. These rings are adapted to one another in cross section such that, in the event of opposite rotation of the two flywheel rings the cross-sectional stress will be the same in all three cases. Therefore, a single material of specific elasticity will suffice for the production of all three rings, and this facilitates manufacture.

Figure 6:
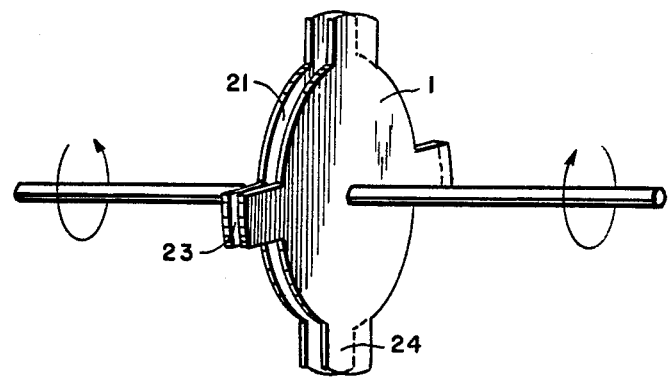
Figure 7:
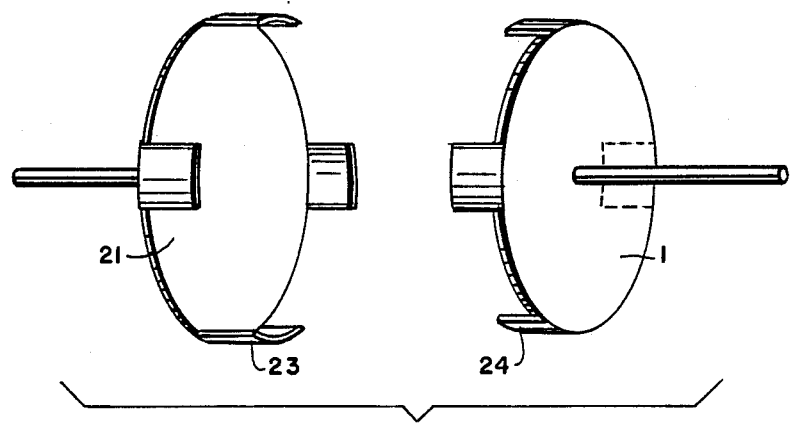
FIGS. 7 and 8 are representational diagrams of viscosity dampers in the disassembled and assembled states, respectively, according to a second preferred embodiment.
Figure 8:
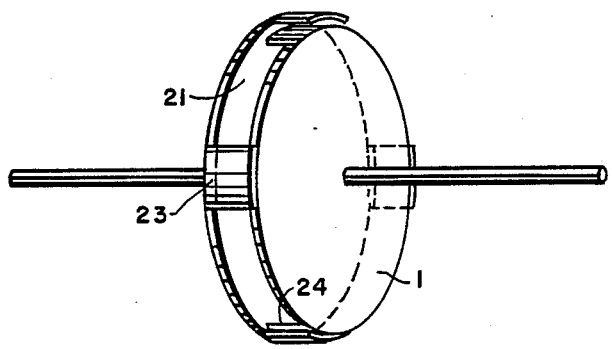

FIGS. 5 to 8 are intended to explain the construction and operation of viscosity dampers like those employed in the embodiments of FIGS. 3 and 4. The viscosity dampers are represented in exploded form in FIGS. 5 and 7, and their relationship to one another when assembled is shown in FIGS. 6 and 8.

Both of the viscosity dampers shown include toothed disks 21 wetted by the viscous liquid. In the static position of rest their teeth 23 are offset slightly axially and radially from correspondingly shaped projections 24 of the relatively moving flywheel ring 1. The toothed disks 21 are affixed nonrotatably with respect to the resting flywheel ring. Their teeth overlap the projections of the relatively movable flywheel ring in the static rest position, at a slight distance apart, and it is immaterial as regards operation whether the teeth and the projections are associated with one another side by side axially as shown in FIGS. 5 and 6 or radially one over the other as shown in FIGS. 7 and 8. Other arrangements are easily possible, and it is important only that they result in the greatest possible congruence of the confronting faces of the teeth 23 and projections 24 when in the static rest position. Upon the introduction of a relative rotation, the teeth 23 can be brought up close to the projections 24, while a high degree of damping action is produced by the viscous medium contained in the gap between the two parts. As the magnitude of the relative rotation increases, the degree of congruity between the confronting faces of the teeth 23 and projections 24 diminishes. The resulting damping action diminishes to the same degree and drops off to a negligible value when there is no longer any congruity between the above-mentioned faces. The transmission of reaction forces is thus largely impeded.

It is easy to understand that the resulting damping action can be adjusted to virtually any characteristic by varying the distance between the confronting faces of the teeth 23 and projection 24 as well as their size, and by varying the viscosity of the liquid contained.

A highly damped relative rotatability of ±10° has proven to be advantageous.

There has thus been shown and described a novel flywheel assembly which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the claims which follow.

What is claimed is:

1. In a flywheel assembly comprising a first flywheel ring adapted to be joined to a drive shaft and a second flywheel ring adapted to be joined to a driven shaft, said first and second flywheel rings being mounted for relative rotation coaxially one inside the other, a spring and a damping system for the suppression of rotary vibrations being coupled in parallel between said first and second flywheel rings, the improvement wherein said damping system includes means for damping rotary vibrations between said flywheel rings upon relative rotation of said flywheel rings within a first angular amount, said damping means providing substantially reduced damping of said rotary vibrations when said first angular amount is exceeded.

2. The flywheel assembly according to claim 1, wherein the first angular amount is less than 30°.

3. The flywheel assembly according to claim 1, wherein the first angular amount is less than 10°.

4. The flywheel assembly according to claim 1, wherein the first angular amount is less than 5°.

5. The flywheel assembly according to claim 1, wherein the spring and the damping system are associated concentrically with the first and the second flywheel rings.

6. The flywheel assembly according to claim 1, wherein the spring consists of rubber-elastic material.

7. The flywheel assembly according to claim 11, wherein the spring joins together radially separated bonding surfaces of the first and second flywheel ring, respectively.

8. The flywheel assembly according to claim 7, wherein with the exception of the bonding surfaces, the flywheel rings are spaced at a distance from the spring.

9. The flywheel assembly according to claim 8, wherein a cavity is formed by the spacing between the relatively rotatable flywheel rings, said cavity being sealed and filled with a liquid.

10. The flywheel assembly according to claim 9, wherein the liquid has a viscosity of 100 to 2000,000 cSt, and wherein the damping system is formed by the liquid and the relatively movable surfaces of the spring and of the flywheel rings which are wetted by the liquid.

11. The flywheel assembly according to claim 10, wherein the relatively rotatable surfaces are provided with damping zones which rotate past one another upon relative rotation of said flywheel rings, wherein the damping zones when rotated by said angular amount.

12. The flywheel assembly according to claim 11, wherein the smallest distance between the damping zones is no more than 0.5 times the size of the distance between the rest of the surfaces.

13. The flywheel assembly according to claim 11, wherein the smaller distance between the damping zones merges in one or more steps with the distance between the rest of the surfaces.

14. The flywheel assembly according to claim 11, wherein the smallest distance between the damping zones merges uniformly with the rest of the surfaces.

15. The flywheel assembly according to claim 9, wherein at least one of the spring and the first and second flywheel rings have at least one annularly extending projection for the enlargement of the surface wetted by the liquid.

16. The flywheel assembly according to claim 1, wherein the spring joins together axially opposite bonding surfaces of the first and second flywheel ring.

17. The flywheel assembly according to claim 16, wherein the flywheel rings are spaced at a distance from the spring outside of the bonding surfaces.

18. The flywheel assembly according to claim 17, wherein a cavity is formed by the spacing between the relatively rotatable flywheel rings, said cavity being sealed and filled with a liquid.

19. The flywheel assembly according to claim 18, wherein the liquid has a viscosity of 100 to 200,000 cSt, and wherein the damping system is formed by the liquid ad the relatively movable surfaces of the spring and of the flywheel rings which are wetted by the liquid.

20. The flywheel assembly according to claim 19, wherein the relatively rotatable surfaces are provided with damping zones to be carried past one another for the formation of the disengaging means, wherein the damping zones in the nonrotated state have a lesser space between them than in the rotated state, and wherein the damping zones are uniformly distributed on the circumference.

21. The flywheel assembly according to claim 20, wherein the smallest distance between the damping zones is no more than 0.5 times the size of the distance between the rest of the surfaces.

22. The flywheel assembly according to claim 20, wherein the smaller distance between the damping zones merges in one or more steps with the distance between the rest of the surfaces.

23. The flywheel assembly according to claim 20, wherein the smallest distance between the damping zones merges uniformly with the rest of the surfaces.

24. The flywheel assembly according to claim 18, wherein at least one of the spring and the first and second flywheel rings have at least one annularly extending projection for the enlargement of the surface wetted by the liquid.

25. The flywheel assembly according to claim 1, wherein the damping system comprises a concentric first friction disk of the one flywheel ring and a concentric second friction disk of the other flywheel ring, which are compressed elastically, and wherein the friction surfaces facing the first and second friction disk are provided only in the area of sectors corresponding to the first angular amount and between these sectors.

26. The flywheel assembly according to claim 25, wherein the friction disks are disposed axially to one another.

* * * * *